(12) United States Patent
Braden et al.

(10) Patent No.: US 9,872,581 B2
(45) Date of Patent: Jan. 23, 2018

(54) HOME APPLIANCE WITH RECESSED WATER VESSEL HOUSING

(75) Inventors: Ben Braden, Lafollette, TN (US);
Russell Dorsten, Knoxville, TN (US);
Jeremy Nash, Knox, TN (US);
Timothy Russell, Jacksboro, TN (US);
Michael Rutherford, Duff, TN (US)

(73) Assignee: BSH Home Appliances Corporation, Irvine, CA (US)

( * ) Notice: Subject to any disclaimer, the term of this patent is extended or adjusted under 35 U.S.C. 154(b) by 1264 days.

(21) Appl. No.: 13/472,527

(22) Filed: May 16, 2012

(65) Prior Publication Data

US 2013/0306054 A1    Nov. 21, 2013

(51) Int. Cl.
*A47J 27/04*    (2006.01)

(52) U.S. Cl.
CPC .......... *A47J 27/04* (2013.01); *A47J 2027/043* (2013.01)

(58) Field of Classification Search
CPC ............................ A47J 27/04; A47J 2027/043
USPC .............................................. 126/369; 99/341
See application file for complete search history.

(56) References Cited

U.S. PATENT DOCUMENTS

| | | | | |
|---|---|---|---|---|
| 3,121,158 A * | 2/1964 | Hurko | .................... | F24C 14/02 126/19 R |
| 4,197,791 A * | 4/1980 | Vieceli | .................... | A47J 27/04 126/369 |
| 4,387,699 A * | 6/1983 | Murch, Jr. | .............. | F24B 1/006 126/61 |
| 5,073,681 A * | 12/1991 | Hubben | .................... | H02G 3/14 174/66 |
| 5,097,753 A * | 3/1992 | Naft | ........................ | A47J 27/04 126/369 |
| 5,404,803 A * | 4/1995 | Glucksman | ............. | A47J 27/04 126/369.1 |
| 5,515,773 A * | 5/1996 | Bullard | .................... | A47J 27/04 126/20 |
| 5,992,301 A * | 11/1999 | Mukumoto | ............. | A47J 27/14 126/20 |
| 6,323,464 B1 * | 11/2001 | Cohn | ..................... | A21C 13/00 126/21 A |
| 6,730,895 B2 * | 5/2004 | Kim | ..................... | H05B 6/6479 219/682 |
| 7,537,004 B2 * | 5/2009 | Reay | ..................... | F24C 15/327 126/20 |
| 7,802,564 B2 * | 9/2010 | Ando | .................... | F24C 15/327 126/20 |

(Continued)

*Primary Examiner* — Avinash Savani
*Assistant Examiner* — Rabeeul Zuberi
(74) *Attorney, Agent, or Firm* — Michael E. Tschupp; Andre Pallapies; Brandon G. Braun

(57) ABSTRACT

A home appliance having a water-fed steaming apparatus, the home appliance including an appliance body housing the steaming apparatus; a water supply vessel for supplying water to the steaming apparatus; a vessel housing within the appliance body for holding the water supply vessel; and a mounting assembly for mounting the vessel housing to the appliance body, the mounting assembly including a bezel having a locking element; a bracket engaged with the vessel housing and the locking element; and a spacer element extending between the appliance body and the bracket to define an air gap between the vessel housing and the appliance body for air flow between the vessel housing and the appliance body for cooling the vessel housing.

10 Claims, 8 Drawing Sheets

(56) References Cited

U.S. PATENT DOCUMENTS

| | | | | |
|---|---|---|---|---|
| 8,166,871 B2* | 5/2012 | Veltrop | ............ | A47J 27/04 |
| | | | | 126/369 |
| 8,256,409 B2* | 9/2012 | Matsubayashi | ....... | F24C 15/327 |
| | | | | 126/20 |
| 8,997,638 B2* | 4/2015 | Park | ............ | A21B 3/04 |
| | | | | 126/21 A |
| 2004/0040954 A1* | 3/2004 | Kim | ............ | H05B 6/6479 |
| | | | | 219/681 |
| 2006/0191913 A1* | 8/2006 | Park | ............ | A47J 31/0573 |
| | | | | 219/679 |
| 2006/0249136 A1* | 11/2006 | Reay | ............ | F24C 15/327 |
| | | | | 126/20 |
| 2006/0278630 A1* | 12/2006 | Sung | ............ | B24B 49/105 |
| | | | | 219/401 |
| 2009/0250452 A1* | 10/2009 | Tse | ............ | F24C 15/327 |
| | | | | 219/401 |
| 2012/0017770 A1* | 1/2012 | Sakane | ............ | F24C 15/327 |
| | | | | 99/331 |
| 2012/0216796 A1* | 8/2012 | Benedetti | ............ | F24C 3/006 |
| | | | | 126/547 |
| 2013/0306054 A1* | 11/2013 | Braden | ............ | A47J 27/04 |
| | | | | 126/369 |
| 2014/0251158 A1* | 9/2014 | Yang | ............ | A47J 27/04 |
| | | | | 99/341 |
| 2014/0251159 A1* | 9/2014 | Yang | ............ | A47J 27/04 |
| | | | | 99/341 |

* cited by examiner

HOME APPLIANCE WITH RECESSED WATER VESSEL HOUSING

BACKGROUND OF THE INVENTION

The present invention relates broadly to ranges for use in cooking and, more particularly, to a range having a steaming compartment and steaming capabilities.

Steaming provides a moist heat for cooking, and is particularly well suited for cooking fish and vegetables. In order to cook food with steam, water is heated to boiling temperatures to produce the steam with which food is cooked. Not all the ranges are connected to a water supply, which would require special plumbing. Therefore, an onboard water source, such as a removable and refillable water vessel is typically supplied with the steaming unit so that a water source is available from which to produce steam. The water vessels are typically plastic vessels that include a removable lid and are fitted somewhere within the range convenient for user access.

Since the water vessel is molded, it can be made in many different shapes and configurations. Therefore, any housing can also be made in the same general shape and configuration to receive and retain the water vessel for cooking.

Some ranges define a narrow opening between an oven and a steaming unit for positioning the water vessel at a convenient location for user access and in a manner convenient for water access by the steamer.

Steaming ovens can be combination steam and convection ovens. Even though the temperature of steam at atmospheric pressure is 212° F., convection use of the oven can make the area adjacent the steamer very hot and the water vessel is in danger of melting, an event that could give rise to an extremely undesirable situation.

It would therefore be desirable to enhance the ability of the water vessel to stay intact and at a reasonable temperature.

SUMMARY OF THE INVENTION

It is accordingly an object of the present invention to enhance the airflow around the vessel and vessel housing in a manner that will tend to reduce the air temperature at the water vessel thereby reducing the instances and chances of melting.

To those ends, the present invention is directed to a home appliance having a water-fed steaming apparatus. The home appliance includes an appliance body housing the steaming apparatus, a water supply vessel for supplying water to the steaming apparatus and a vessel housing within the appliance body for holding the water supply vessel. A mounting assembly is included for mounting the vessel housing to the appliance body. The mounting assembly includes a bezel having a locking element and a bracket engaged with both the vessel housing and the locking element. A spacer element extends between the appliance body and the bracket to define an air gap between the vessel housing and the appliance body for air flow between the vessel housing and the appliance body for cooling the vessel housing.

Preferably, the appliance body defines an access opening into the vessel housing and the bezel is mounted to the appliance body in a surrounding relationship with the access opening. The bezel may include a flange turned inwardly toward the vessel holder to block the view of at least a portion of the air gap from viewing from outside the appliance body.

It is further preferred that the spacer element includes a projection extending between the bracket and the appliance body for abutment with an inner surface of the range body. The projection may be on the bracket and extend outwardly toward the appliance body.

Preferably, the locking element includes a threaded member projecting from the bezel toward an interior of the appliance body and a nut engaged with the threaded member, wherein the bracket is between the nut and the appliance body, with the projection extending between the bracket and the appliance body to define the air gap.

It is also preferred that the locking element include a threaded member projecting from the bezel toward an interior of the appliance body and a nut engaged with the threaded member, wherein the bracket is between the nut and the appliance body. Preferably, the spacer element is a nut engaged with the threaded member between the bracket and the appliance body and abutting the bracket to define the air gap.

It is preferred that the housing defines a cavity and an access opening, and includes a vessel housing flange projecting laterally away from the access opening. The bracket may therefore be operatively engaged with the vessel housing flange to facilitate securing the vessel housing in the appliance body.

The present invention is also embodied in a range for cooking, wherein the range includes a water-fed steaming apparatus. The range includes a range body housing the steaming apparatus, a water supply vessel for supplying water to the steaming apparatus and a vessel housing within the range body for holding the water supply vessel. The range also includes a mounting assembly for mounting the vessel housing to the range body. The mounting assembly includes a bezel having a locking element and a bracket engaged with both the vessel housing and the locking element. A spacer element extends between the range body and the bracket to define an air gap between the vessel housing and the range body for air flow between the vessel housing and the range body for cooling the vessel housing.

It is preferred that the range body defines an access opening into the vessel housing and the bezel is mounted the range body in a surrounding relationship with the access opening. The bezel preferably includes a flange turned inwardly toward the vessel holder to block the view of at least a portion of the air gap from viewing from outside the range body.

Preferably, the spacer element includes a projection extending between the bracket and the range body for abutment with an inner surface of the range body. The projection is preferably on the bracket and extends outwardly toward the range body.

It is further preferred that the locking element includes a threaded member projecting from the bezel toward an interior of the range body and a nut engaged with the threaded member. The bracket may be between the nut and the range body, with the projection extending between the bracket and the range body to define the air gap.

Preferentially, the locking element includes a threaded member projecting from the bezel toward an interior of the range body and a nut engaged with the threaded member. In such case, the bracket is between the nut and the range body. It is preferred that the spacer element is a nut engaged with the threaded member between the bracket and the range body and abutting the bracket to define the air gap.

Preferably, the vessel housing defines a cavity and an access opening and further includes a vessel housing flange projecting laterally away from the access opening. The bracket is then operatively engaged with the vessel housing flange to facilitate securing the vessel housing in the range body.

DESCRIPTION OF THE PREFERRED EMBODIMENT

Figure 1:
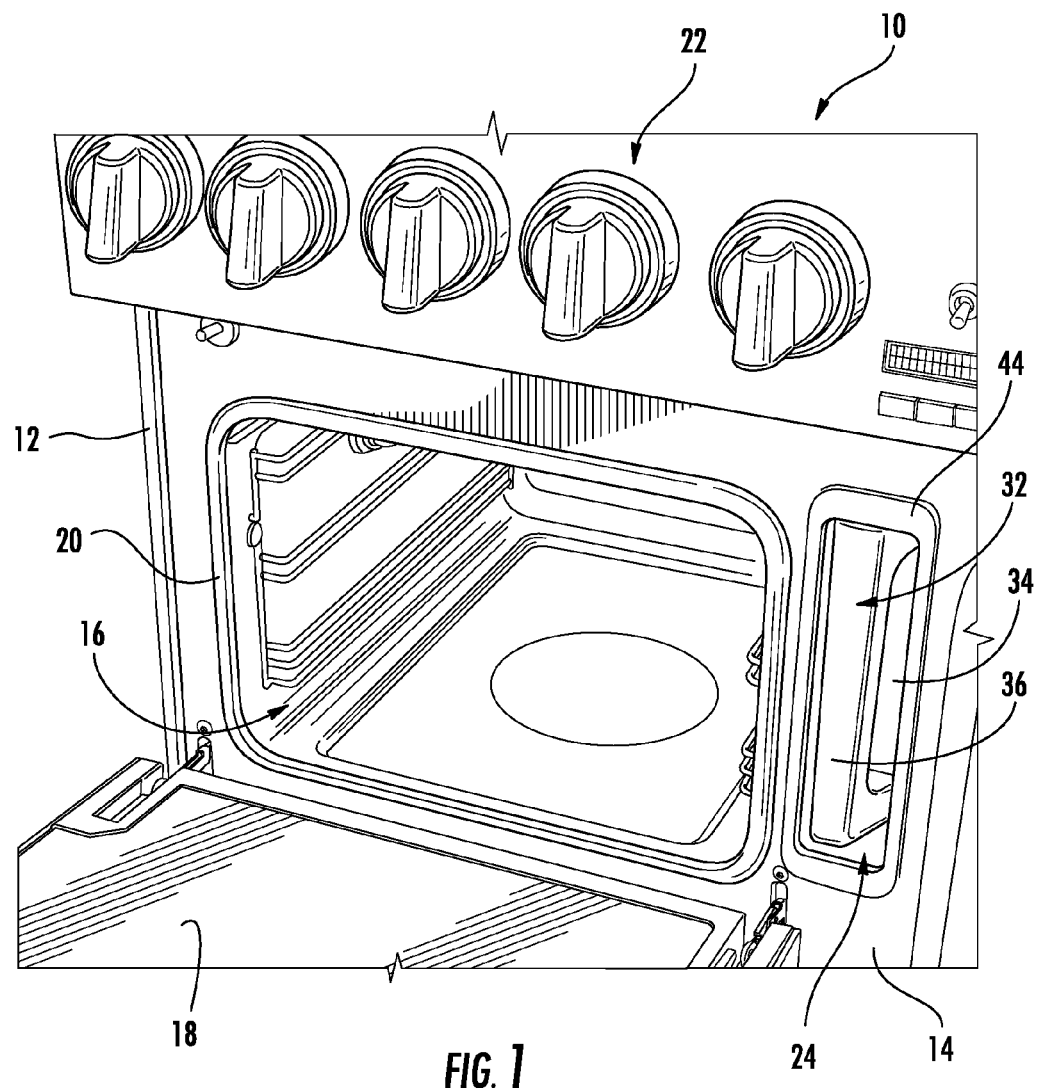
FIG. 1 is a perspective view of a home appliance in the form of a range having a steam chamber with an improved water vessel housing according to one preferred embodiment of the present invention.

Turning now to the drawings and, more particularly to FIG. 1, a range having a steaming unit is illustrated generally at 10 and includes a range body 12 including several body panels 14 that are general planar and include various openings and attachments. The range body 12 defines a steamer cavity 16 for use during steam cooking operations. Typically such a range will include a conventional oven (not shown) and a cooktop (not shown). A gasket 20 is attached to the body panel 14 to extend circumferentially about the steamer cavity opening. A door 18 is provided for movement in and out of a covering relation with the steamer cavity 16. A control panel 22 is provided on the range 10 above the steamer cavity 16.

In order to provide water for steam, a water vessel 32 is provided and is fitted to a housing within a water vessel cavity 24 which is open for user access to the water vessel 32 for refilling, cleaning or both.

Figure 2:
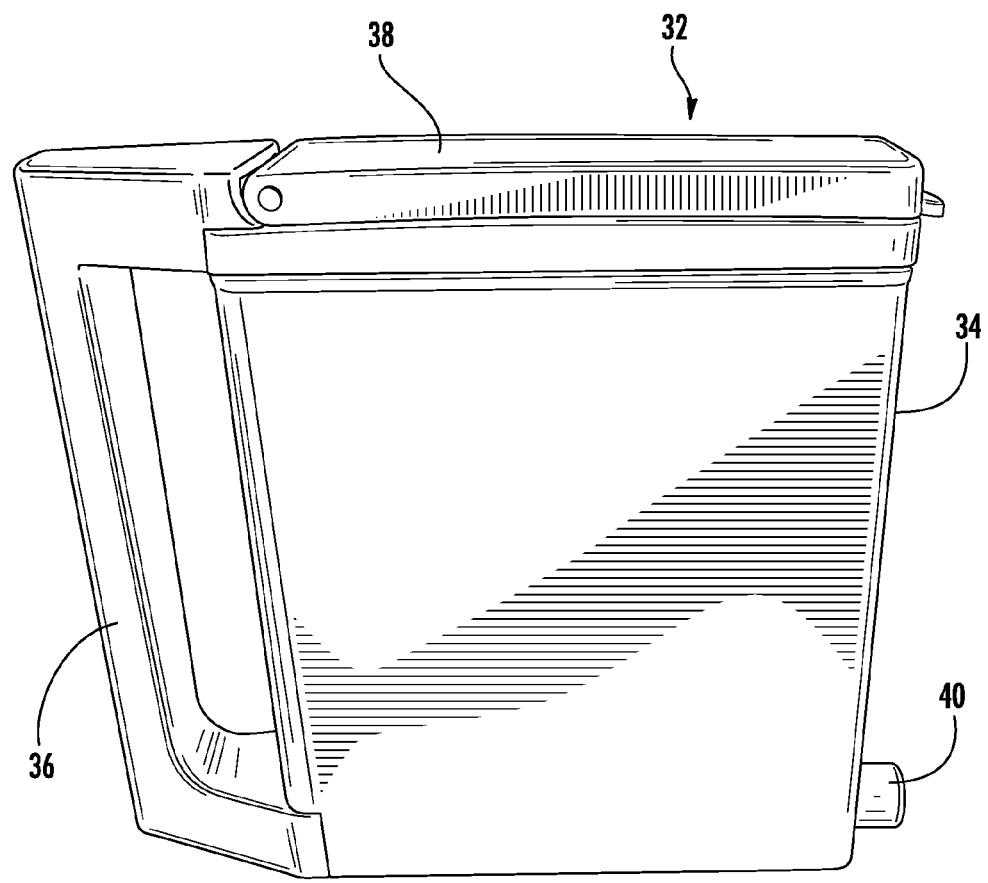
FIG. 2 is a side view of the water vessel used with the range illustrated in FIG. 1.

As seen in FIG. 2, the water vessel 32 is a generally rectangular unit that includes a generally narrow body 34 having a hinged lid 38. A generally C-shaped handle 36 extends from the lid 38 to the base of the body 34. At the base opposite the handle 36, a fluid connector 40 is provided so that water can be moved from the water vessel 32 to the steaming chamber 16 for cooking.

With reference to FIG. 1, the water vessel housing includes a bezel 44 extending circumferentially about the opening to the water vessel housing. The bezel 44 provides a clean, finished look to the water vessel housing structure which is visible with the door 18 open or the door 18 closed.

Figure 3:
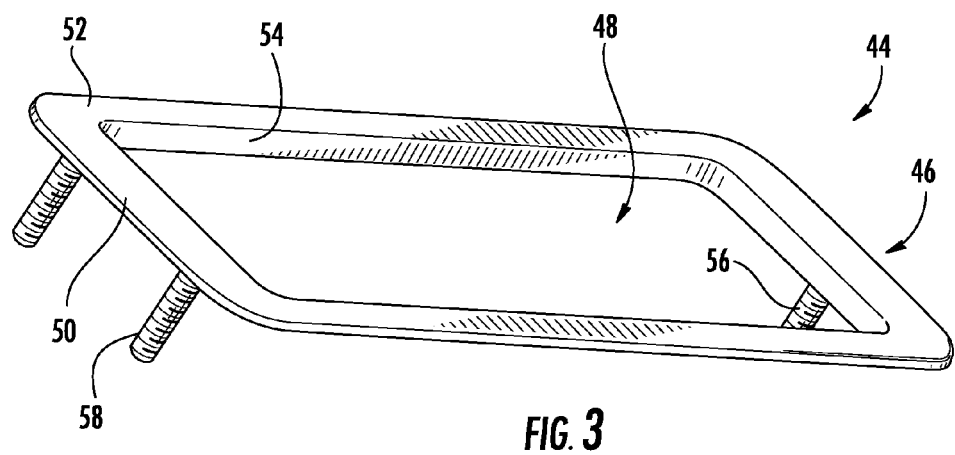
FIG. 3 is a top perspective view of a bezel used with the range illustrated in FIG. 1.
Figure 4:
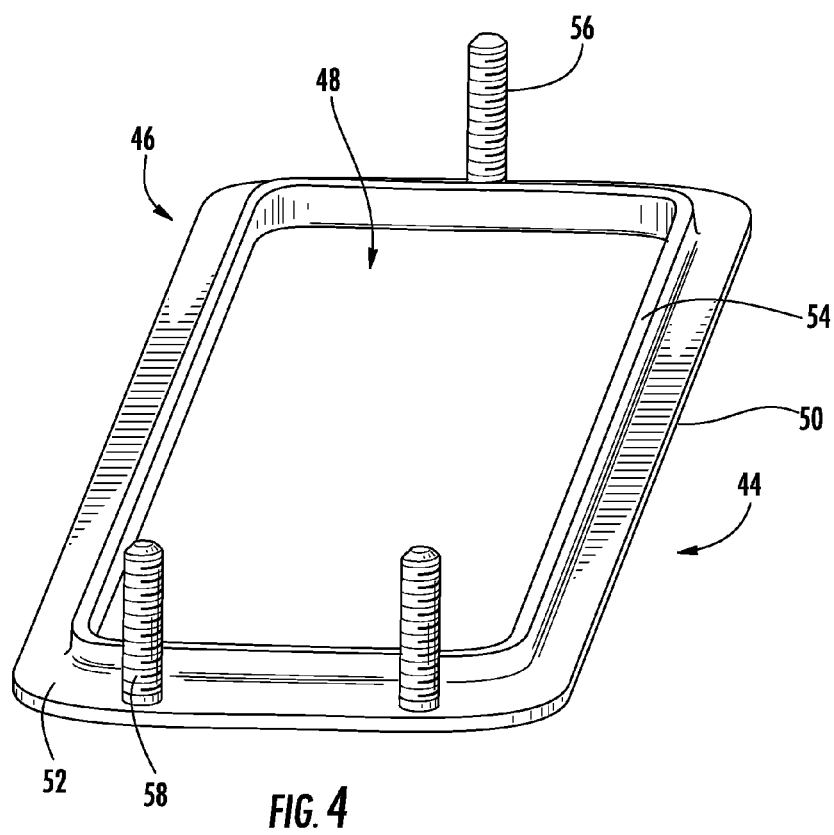
FIG. 4 is a bottom perspective view of the bezel illustrated in FIG. 3.

Turning now to FIGS. 3 and 4, the bezel 44 is illustrated as a generally rectangular planar bezel body 46 having rounded corners 52 and defining a generally rectangular opening 48 through the bezel body 46. A flange 54 is on the inside of the opening and projects generally perpendicularly away from the bezel body 46. The outer side of the bezel body 46 forms a rim 50.

Three threaded members project outwardly from the bezel body 46. Two generally cylindrical threaded cylinders 58 are on one short side of the rectangular body 46. A single cylindrical threaded member 56 projects outwardly from the opposite short side of the rectangular body 46. The bezel flange 54 extends inwardly a predetermined distance, when mounted, to block the view of the air gap from outside the range 10.

Figure 5:
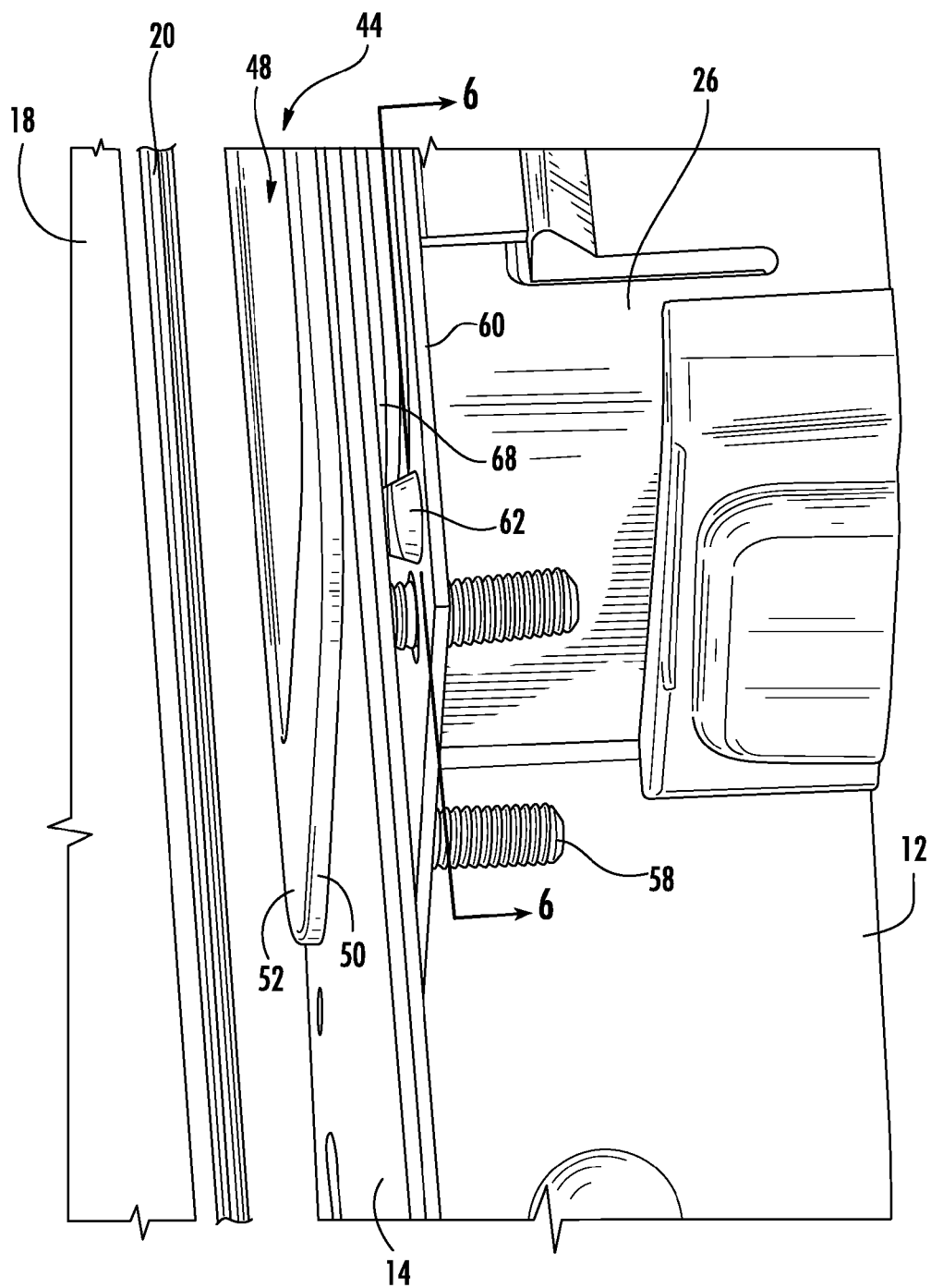
FIG. 5 is a side view of the bezel and mounting assembly associated with the range illustrated in FIG. 1.
Figure 6:
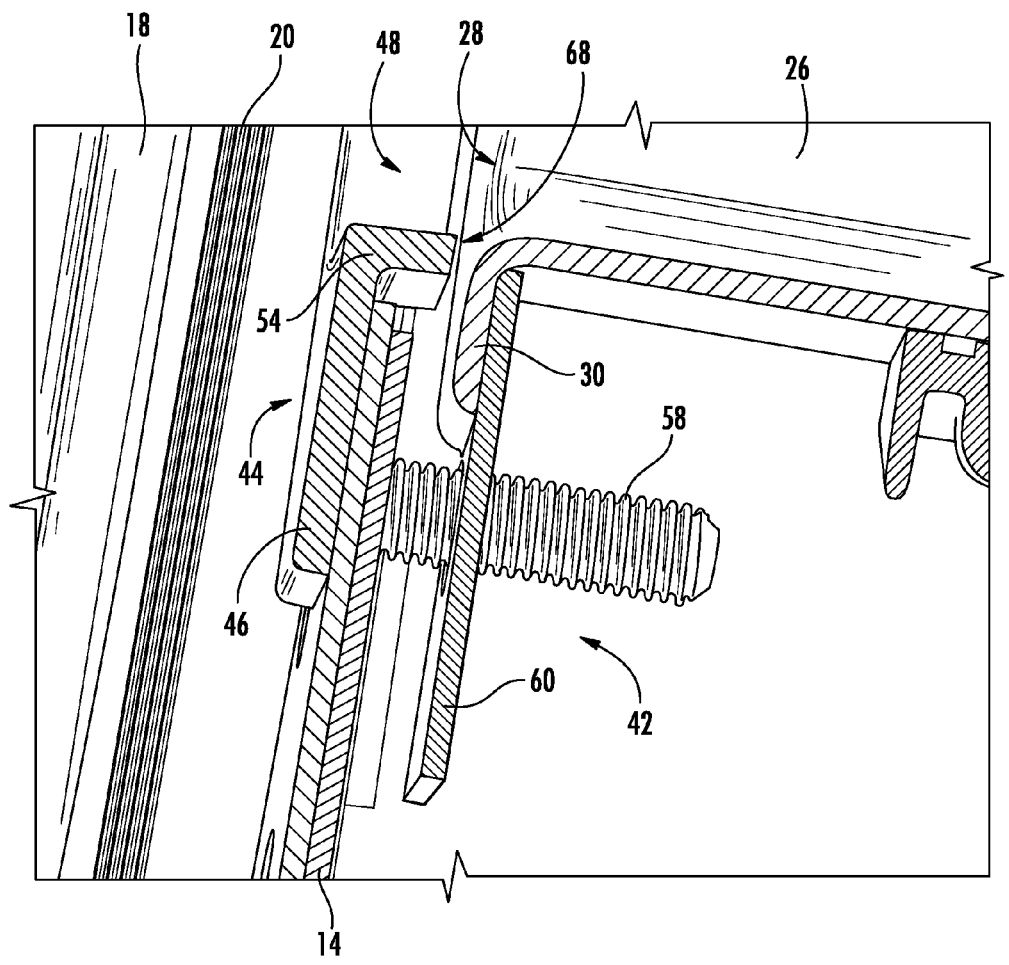
FIG. 6 is a section view of the mounting assembly taken along line 6-6 of FIG. 5.

Turning now to FIG. 5 and FIG. 6, a unique mounting arrangement is provided to create a space between the water vessel housing 26 and the bezel 44, more particularly, the bezel flange 54, in order to provide an define an air channel or air gap 68 extending between the range body panel 14 and the water vessel housing 26, as best seen in FIG. 6. The air gap 68 is sufficient to maintain cooling of the vessel housing 26 and the water vessel 32 in the vessel housing 26 so that the water vessel 32 is no longer in danger of melting.

Figure 7:
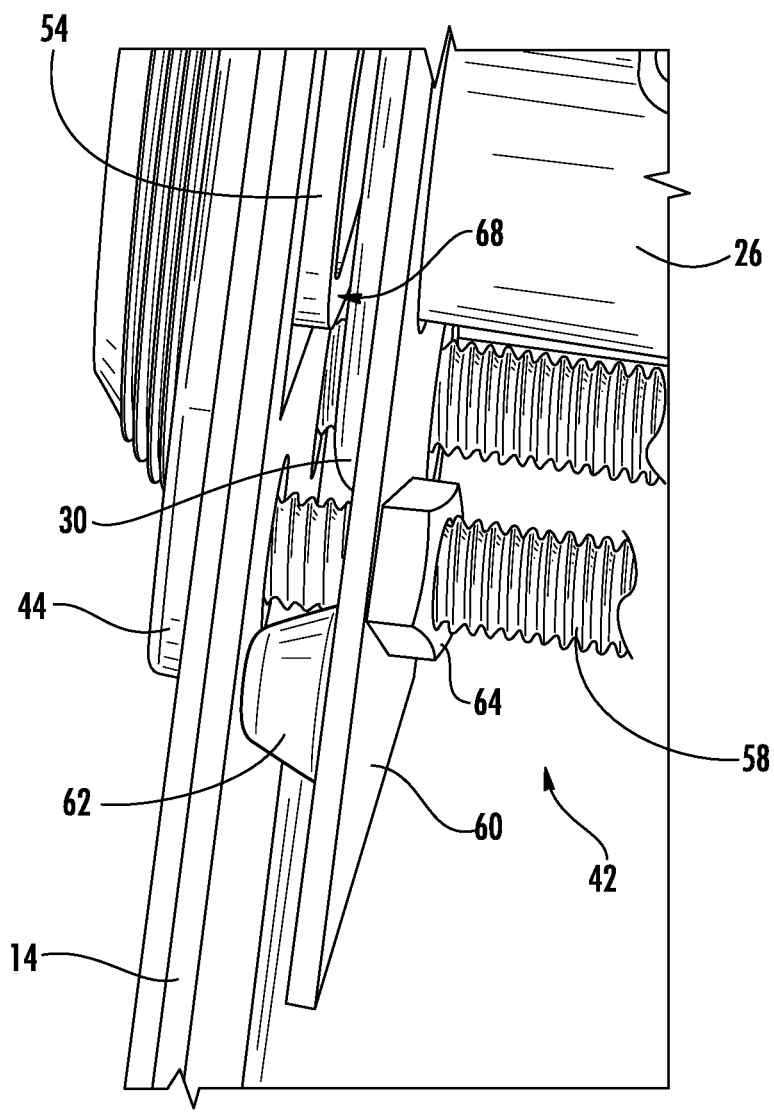
FIG. 7 is a side view of the mounting assembly according to a first preferred embodiment of the present invention.

With reference to FIG. 6 and FIG. 7, the first preferred embodiment of the mounting assembly 42 is illustrated. There, the bezel 44 extends around the opening in the range panel 14 for the water vessel 32, which is in registry with the bezel opening 48 and the water vessel housing opening 28. The lower threaded cylinders 58 project from the bezel body 56 inwardly through the range panel 14 toward the interior of the range 10. The water vessel housing 26 is mounted to the range 10 using the threaded cylinders 58. A generally planar bracket 60 is fitted to the water vessel housing 26 in a surrounding relationship with the housing access opening 28 and abuts the housing flange 30. Two openings are in the bracket 60 for accommodation of the threaded cylinders 58. A projection 62 is on the bracket 58 which, from the back, appears as a dimple in the metal. The projection 62 extends toward the range body panel 14 and abuts the range body panel 14 to define the air gap 68 therebetween. A nut 64 engaged with the threaded cylinder 58 helps to hold the bracket 60 in place. It should be understood that the upper, single cylindrical threaded member 56 is attached to the range 10 in a manner similar to that described herein with respect to the lower cylindrical threaded members 58.

The relationship between the various panel structures is seen best in FIG. 6. There, the bezel body 46 abuts the range body panel 14 and includes the threaded cylinders 58 projecting through openings in the range body panel 14 toward the interior of the range 10. The bracket 60 includes an opening through which a threaded cylinder 58 projects. Inward of the threaded cylinder 58, the bracket 60 abuts a flange 30 surrounding the access opening 28 of the water vessel housing 26. The bezel flange 54 is curved inwardly and directed toward the water vessel housing 26. The air gap 68 is defined between the bezel flange 54 and the water vessel flange 30.

As seen in FIG. 7, the projection 62 abuts the range body panel 14 and a nut 64 is attached to a threaded cylinder 58 to move the bracket 60 toward the range body panel 14 until the project 62 encounters the range body panel 14 to thereby define the air gap 68, and to maintain the bracket 60 in place.

Figure 8:
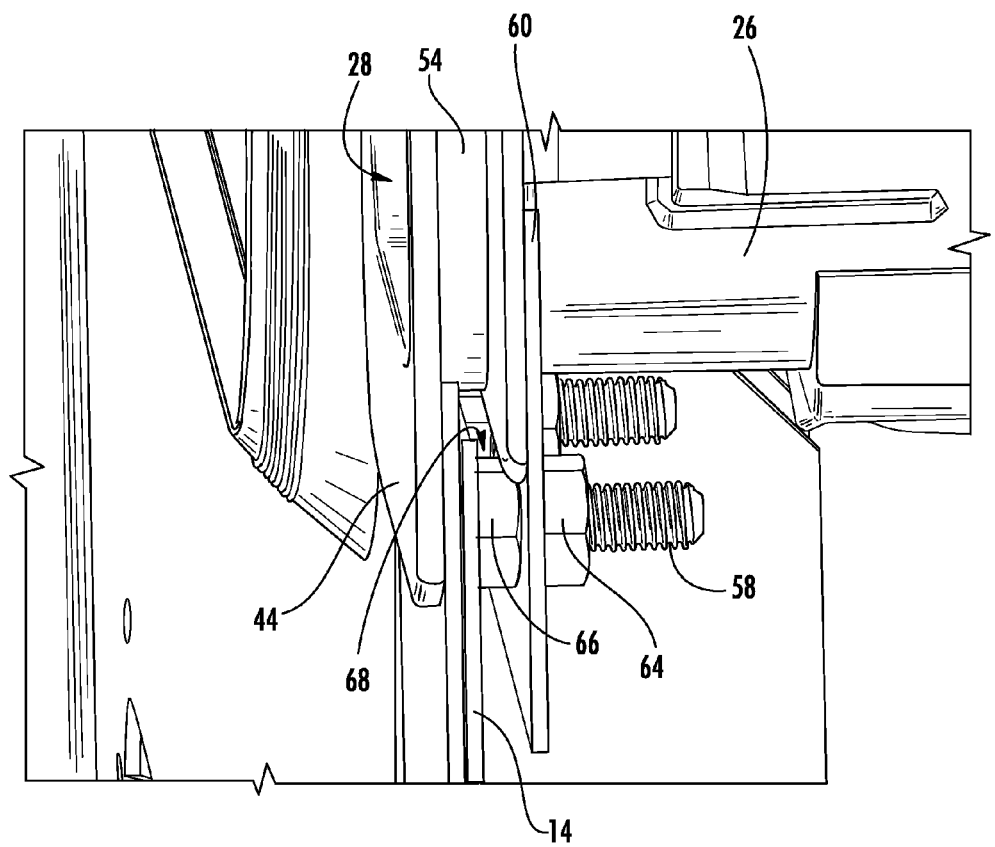
FIG. 8 is a side view of the mounting assembly according to a second preferred embodiment of the present invention.
Figure 9:
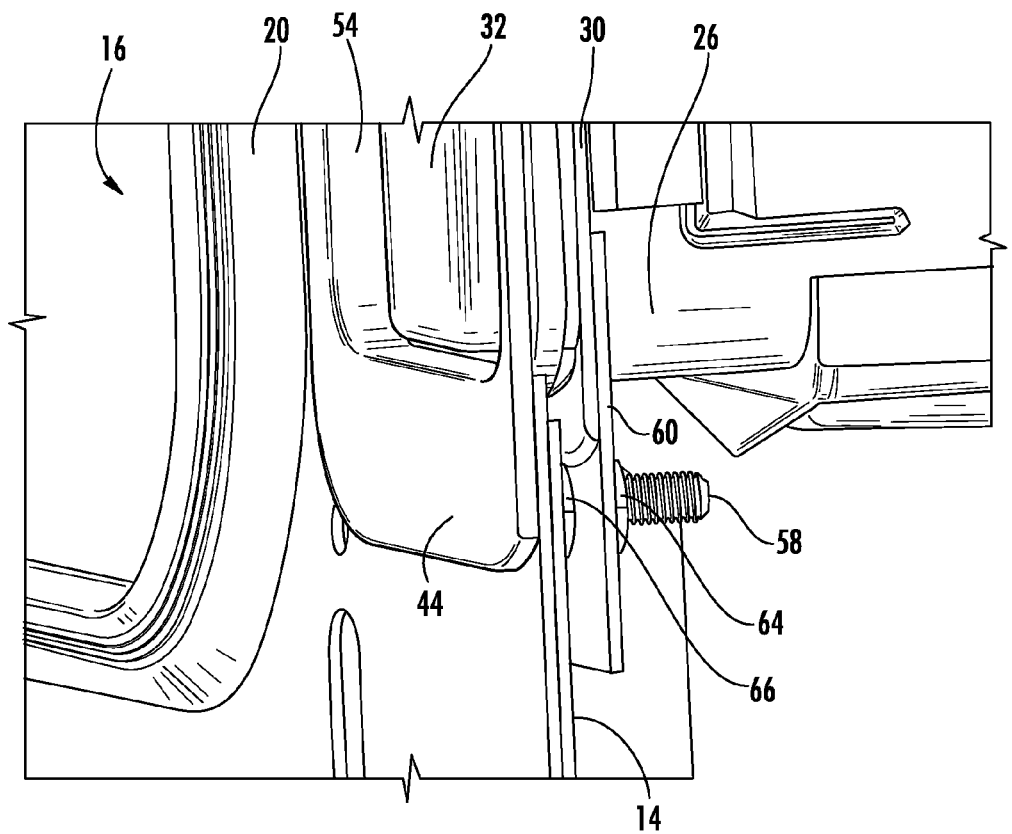
FIG. 9 is a front perspective view of the bezel and mounting assembly illustrated in FIG. 8.

Turning now to FIG. 8 and FIG. 9, a second preferred embodiment of the mounting 42 is illustrated. There, the air gap 68 may be adjusted using a spacer nut 66 along the threaded cylinder 58 intermediate the bracket 60 and the range body panel 14. Wherever the spacer nut 66 is positioned, with the nut 64 tightened against the bracket, the bracket 60 will remain in that position. Once again, such positioning of the bracket 60 defines the air gap 68. Whether the spacer is a spacer nut 66 or a projection 62, the bracket 60 is locked in place against the flange 30 of the water vessel housing 26 using the nut 64 attached to the threaded shaft 58.

By the above, the present invention provides a range having a steaming unit with an onboard water supply that structurally acts to prevent the water supply vessel from melting.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

What is claimed is:

1. A home appliance having a water-fed steaming apparatus, the home appliance comprising:
    an appliance body housing the steaming apparatus;
    a water supply vessel for supplying water to the steaming apparatus;
    a vessel housing within the appliance body for holding the water supply vessel; and
    a mounting assembly for mounting the vessel housing to the appliance body, the mounting assembly including:
        a bracket engaged with the vessel housing and the locking element; and
        a bezel positioned exterior to the appliance body having a locking element extending through a portion of the appliance body, the locking element including a threaded member projecting from the bezel toward an interior of the appliance body and a nut engaged with the threaded member, wherein the bracket is between the nut and the appliance body;
        a spacer element extending between the appliance body and the bracket to define an air gap between the vessel housing and the appliance body for air flow between the vessel housing and the appliance body and around the spacer element for cooling the vessel housing, spacer element projecting outwardly from the bracket toward the appliance body;
        wherein the bezel includes an arrangement for blocking the view from outside of the appliance body of a portion of the air gap.

2. A home appliance according to claim 1 wherein the appliance body defines an access opening into the vessel housing and the bezel is mounted to the appliance body in a surrounding relationship with the access opening, the arrangement for blocking the view including a flange on the bezel extending into the vessel housing to block the view of a portion of the air gap from viewing from outside the appliance body, wherein the air gap extends between the flange and the vessel housing.

3. A home appliance according to claim 1 wherein the locking element includes a threaded member projecting from the bezel toward an interior of the appliance body and a nut engaged with the threaded member, wherein the bracket is between the nut and the appliance body.

4. A home appliance according to claim 3 wherein the spacer element is a nut engaged with the threaded member between the bracket and the appliance body abutting the bracket to define the air gap.

5. A home appliance according to claim 1 wherein the vessel housing defines a cavity and an access opening and includes a vessel housing flange projecting laterally away from the access opening and wherein the bracket is operatively engaged with the vessel housing flange to facilitate securing the vessel housing in the appliance body.

6. A range having a water-fed steaming apparatus, the range comprising:
    a range body housing the steaming apparatus;
    a water supply vessel for supplying water to the steaming apparatus;
    a vessel housing within the range body for holding the water supply vessel; and
    a mounting assembly for mounting the vessel housing to the range body, the mounting assembly including:
        a bezel positioned exterior to the appliance body having a locking element extending through a portion of the appliance body, the locking element including a threaded member projecting from the bezel toward an interior of the range body and a nut engaged with the threaded member;
        a bracket engaged with the vessel housing and the locking element wherein the bracket is between the nut and the range body; and
        a spacer element extending between the range body and the bracket to define an air gap between the vessel housing and the range body for air flow between the vessel housing and the range body and around the spacer element for cooling the vessel housing, the spacer element projecting outwardly from the bracket toward the appliance body;
        wherein the bezel includes an arrangement for blocking the view from outside of the range body of a portion of the air gap.

7. A range according to claim 6 wherein the range body defines an access opening into the vessel housing and the bezel is mounted to the range body in a surrounding relationship with the access opening, the arrangement for blocking a view includes a flange extending into the vessel housing to block the view of a portion of the air gap from viewing from outside the range body, wherein the air gap extends between the flange and the vessel housing.

8. A range according to claim 6 wherein the locking element includes a threaded member projecting from the bezel toward an interior of the range body and a nut engaged with the threaded member, wherein the bracket is between the nut and the range body.

9. A range according to claim 8 wherein the spacer element is a nut engaged with the threaded member between the bracket and the range body abutting the bracket to define the air gap.

10. A range according to claim 6 wherein the vessel housing defines a cavity and an access opening and includes a vessel housing flange projecting laterally away from the access opening and wherein the bracket is operatively engaged with the vessel housing flange to facilitate securing the vessel housing in the range body.

* * * * *